US009031972B2

(12) United States Patent
Yin et al.

(10) Patent No.: US 9,031,972 B2
(45) Date of Patent: May 12, 2015

(54) METHOD AND DEVICE FOR EXTRACTING RELATIONSHIP CIRCLE OF MEMBERS IN SOCIAL NETWORK SERVICE (SNS) NETWORK

(75) Inventors: Yu Yin, Shenzhen (CN); Gengping Cai, Shenzhen (CN); Haibin Hu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 217 days.

(21) Appl. No.: 13/230,269

(22) Filed: Sep. 12, 2011

(65) Prior Publication Data
US 2011/0320485 A1 Dec. 29, 2011

Related U.S. Application Data

(63) Continuation of application No. PCT/CN2010/070309, filed on Jan. 21, 2010.

(30) Foreign Application Priority Data

Mar. 12, 2009 (CN) .......................... 2009 1 0105978

(51) Int. Cl.
G06F 17/30 (2006.01)
H04L 12/58 (2006.01)
G06Q 10/10 (2012.01)

(52) U.S. Cl.
CPC .............. *H04L 12/588* (2013.01); *G06Q 10/10* (2013.01); *H04L 51/32* (2013.01)

(58) Field of Classification Search
CPC ................... G06F 17/30056; G06F 17/30082; G06Q 10/10
USPC .......................... 707/758, 769, 770, 771, 802
See application file for complete search history.

(56) References Cited

U.S. PATENT DOCUMENTS

2005/0060417 A1* 3/2005 Rose ............................. 709/228
2005/0193010 A1* 9/2005 DeShan et al. ............. 707/104.1
(Continued)

FOREIGN PATENT DOCUMENTS

CN 101197878 A 6/2008
CN 101216829 A 7/2008
(Continued)

OTHER PUBLICATIONS

International Search Report: mailed Apr. 15, 2010; PCT/CN2010/070309.
(Continued)

*Primary Examiner* — Sangwoo Ahn
*Assistant Examiner* — Ahmed Abraham
(74) *Attorney, Agent, or Firm* — Harness, Dickey & Pierce, P.L.C.

(57) ABSTRACT

A method and device for extracting relationship circle of members in SNS network is disclosed. The method includes: (a) selecting target people in the SNS network; (b) analyzing relationship chains of the target people, and extracting a relationship circle of the target people from the relationship chains according to feature filtering conditions. The device includes a target people selection module for selecting the target people in the SNS network; a relationship circle extracting module for analyzing the relationship chains and extracting the relationship circle from the relationship chains according to the feature filtering conditions. Applying the method and device can provide persons who can meet the designated features and their relationship in the SNS network; using the relationship circle of the target people can find out valuable relationship chain information, enable accurate search and transmission of information, and facilitate promotion and cooperation of business activities.

5 Claims, 8 Drawing Sheets

(56) References Cited

U.S. PATENT DOCUMENTS

| | | |
|---|---|---|
| 2006/0047419 A1* | 3/2006 | Diendorf et al. ............... 701/208 |
| 2007/0011665 A1* | 1/2007 | Gandhi et al. ................. 717/136 |
| 2007/0060129 A1* | 3/2007 | Ramer et al. .................. 455/439 |
| 2007/0136178 A1* | 6/2007 | Wiseman et al. ............... 705/37 |
| 2007/0150603 A1 | 6/2007 | Crull et al. |
| 2008/0059576 A1* | 3/2008 | Liu et al. ....................... 709/204 |
| 2008/0062244 A1 | 3/2008 | Wu et al. |
| 2008/0140788 A1* | 6/2008 | Carter et al. .................. 709/206 |
| 2008/0222060 A1* | 9/2008 | Perng et al. ..................... 706/12 |
| 2009/0049127 A1* | 2/2009 | Juan et al. ..................... 709/204 |
| 2009/0094232 A1* | 4/2009 | Marvit et al. .................... 707/5 |
| 2011/0302160 A1* | 12/2011 | Juan et al. ..................... 707/723 |

FOREIGN PATENT DOCUMENTS

| | | |
|---|---|---|
| CN | 101510856 A | 8/2009 |
| EP | 0 924 919 A2 | 6/1999 |
| JP | 2007-328723 A | 12/2007 |
| JP | 2008-146246 A | 6/2008 |

OTHER PUBLICATIONS

First Chinese Office Action dated Jul. 12, 2010; Application No. 200910105978.3.
Chinese Rejection dated Jun. 24, 2011; Application No. 200910105978.3 (English Translation is translation for the office action, which is similar to the Chinese Rejection).
Canadian Office Action dated Jun. 4, 2013; Appln. No. 2,753,096.
Chinese Notice of Re-Examination dated Apr. 1, 2013; Appln. No. 200910105978.3.
Chinese Notice of Decision of Re-Examination dated Aug. 22, 2013; Appln. No. 200910105978.3.
Indonesian Office Action dated Jul. 10, 2013; Appln. No. W-00201103662.
First Mexican Office Action dated Sep. 10, 2013; Appln. No. MX/A/2011/009462.
Second Mexican Office Action dated Mar. 18, 2014; Appln. No. MX/a/2011/009462.
First Russian Office Action dated Feb. 28, 2013; Appln. No. 2011140609.
Second Russian Office Action dated Jul. 29, 2013; Appln. No. 2011140609.

* cited by examiner

METHOD AND DEVICE FOR EXTRACTING RELATIONSHIP CIRCLE OF MEMBERS IN SOCIAL NETWORK SERVICE (SNS) NETWORK

CROSS REFERENCE

The present application claims priority of Chinese Patent Application No. 200910105978.3, filed on Mar. 12, 2009, and entitled "method and device for extracting relationship circle of members in SNS network", which is incorporated herein by reference.

FIELD OF THE INVENTION

The present invention relates to computer network technology, and more particularly, to a method and device for extracting a relationship circle of members in SNS network.

BACKGROUND ART

Network instant messaging tools developed until today, have been accepted by the majority of the internet users and become indispensable software tools for the users. The network instant messaging tools have been widely used not only in daily entertainments but also in user's working. The instant messaging software can provide more and more functions, and these functions are also gradually maturing. At the same time, in the social networks service (SNS) formed among online users, it is no longer just an individual user's relationship with a single user, but one-to-many and many-to-many relationships. The social networks include online users and their relationship networks, have a very great value, enable accurate search and transmission of information, and meet the different needs of users and businesses.

The SNS network includes mass users and mass relation data, thus a basic problem to be solved is how to find out valuable and interesting information from the mass data of the SNS network. Obviously, not all the mass users and mass relation data of the SNS network are concerned by the individual users or the business users, the individual users or the business users are interested in relationship circles of specific targets.

Most of the existing SNS websites support the search for network members by keywords, the search results can show every person who can meet the designated features but cannot show relationship among these persons and relationship circles defined by them, and cannot analyze and extract relationship circles of special targets. Therefore, more valuable relationship information cannot be found.

SUMMARY

The technical problems solved by the invention is aiming to the solve problems that the prior art that cannot show relationship among SNS network members and relationship circles defined by them, and a method and device for extracting a relationship circle of members in SNS network are provided.

In order to achieve the purpose of the invention, a method for extracting a relationship circle of members in an SNS network is provided, which includes:

(a) selecting target people in the SNS network; and (b) analyzing relationship chains of the target people, and extracting a relationship circle of the target people from the relationship chains of the target people according to feature filtering conditions.

Preferably, the step (a) comprises:

(a1) establishing a concerned group database, and selecting the target people from the concerned group database according to query conditions; and (a2) setting a scale predetermined value of the relationship circle of the target people, a level predetermined value of the relationship circle of the target people and feature filtering conditions of relationship circle members.

Preferably, the concerned group database stores feature information of concerned group and a unique identify of the concerned group corresponding to the SNS network.

Preferably, the step (b) further comprises:

(b1) extracting contact person's information of the target people from the relationship chains of the target people; and (b2) selecting relationship circle members of the target people according to the feature filtering conditions and the contact person's information, and determining levels of the relationship circle members within the relationship circle.

Preferably, the contact person's information includes unique identifies of the contact persons corresponding to the SNS network, feature information, relationship type and relationship weight.

Preferably, the step (b2) further comprises:

(b21) setting a current level of the relationship circle to 0, and adding the target people as relationship circle members to an unprocessed queue, meanwhile flushing a processed queue;

(b22) determining whether scale of a current relationship circle reaches the scale predetermined value, if it is then an extraction process of the relationship circle is completed, otherwise performing step (b23);

(b23) determining whether the unprocessed queue is empty, if it is then the extraction process of the relationship circle is completed, otherwise removing a first relationship circle member from the unprocessed queue as a current relationship circle member added to the processed queue, and setting a current level to be a level of the current relationship circle member;

(b24) extracting feature information of the current relationship circle member, and determining whether the current level is 0, if it is then performing step (b26), otherwise performing step (b25);

(b25) determining whether feature information of the current relationship circle member meets the feature filtering conditions, if it is then performing step (b26), otherwise performing step (b22);

(b26) determining whether the current level plus 1 is smaller than the level predetermined value, if it is then performing step (b27), otherwise performing step (b22);

(b27) traversing every contact person of the current relationship circle member, if the contact person is neither in the unprocessed queue nor in the processed queue, the contact person as a relationship circle member is added to a tail of the unprocessed queue, and a level of the contact person is set to a current level plus 1, then performing step (b28); otherwise directly performing step (b28); and (b28) storing feature information, contact person's information and levels of the current relationship circle member in a relationship circle database, and then performing step (b22).

Preferably, the method further includes (c) displaying the relationship circle members according to levels based on information of the relationship circle database.

Preferably, the method further includes (d) extracting relationship information and/or feature information of each relationship circle member of the relationship circle, and calculating influence of each relationship circle member in the relationship circle according to the relationship information and/or feature information.

Preferably, the step (d) further comprises:

(d1) extracting feature information of relationship circle members, and calculating characteristics ratings of the relationship circle members according to the matching degree between the feature information of the relationship circle members and the feature filtering conditions of the relationship circle;

(d2) extracting relationship information of the relationship circle members, and calculating relationship ratings of the relationship circle members according to relationship information of the relationship circle members; and (d3) calculating influence of the relationship circle members according to weighted results of the characteristics ratings and the relationship ratings.

In order to better achieve the purpose of the invention, a device for extracting relationship circle of members in social network service (SNS) network is provided, the device includes:

a target people selection module for selecting target people in the SNS network; and a relationship circle extracting module for analyzing relationship chains of the target people and extracting a relationship circle of the target people from the relationship chains of the target people according to feature filtering conditions.

Preferably, the relationship circle extracting module comprises:

a relationship extracting unit for obtaining contact person's information of the target people from the relationship chains of the target people; and a relationship circle constructing unit for extracting relationship circle members of the target people according to the feature filtering conditions and the contact person's information, and determining levels of the relationship circle members within the relationship circle.

Preferably, the device further includes: a concerned group database for storing feature information of concerned group and unique identifies of the concerned group corresponding to the SNS network; and wherein the target people selection module select the target people from the concerned group database according to query.

Preferably, the device further includes:

an SNS network member database for storing information of members in the SNS network;

a feature-rule-database for storing feature keywords extracted from the SNS network member database;

a feature extracting module for extracting features of network members from the SNS network member database according to the feature keywords;

a concerned group database constructing module for selecting concerned group from the SNS network member database according to designated features to construct the concerned group database; and a relationship circle database for storing feature information, contact person's information, level information of the relationship circle members.

Preferably, the device further includes: a relationship circle display module for displaying the relationship circle members according to levels.

Preferably, the device further includes: an influence calculating module for calculating influence of each relationship circle member in the relationship circle according to the relationship information and/or feature information of each relationship circle member of the relationship circle.

In the preset invention, by analyzing relationship chains of the target people, extracting relationship circle members of the target people according to designated feature filtering conditions and constructing relationship circle, network members who can meet the designated features and their relationship in the SNS network are provided. The relationship circle of the target people can be used to find out valuable relationship chain information, enable accurate search and transmission of information, and facilitate promotion and cooperation of business activities. Further, in the invention, influence of each relationship circle member in the relationship circle can be calculated according to the relationship information and/or feature information of each relationship circle member of the relationship circle, this helps to find out the most influential people in the relationship circle and make the information transmission and retrieval more targeted.

BRIEF DESCRIPTION OF THE DRAWINGS

The present invention will be further explained in the following with reference to embodiments and drawings, in which.

DETAILED DESCRIPTION OF EXAMPLES

In order to make objects, solutions and advantages of the invention clear, the present invention is hereinafter further explained in details with reference to embodiments and drawings. It will be understood that the hereinafter embodiments are for the purpose of illustration only, and not for the purpose of limitations.

In the preset invention, a relationship circle of target people as a start point of a relationship chain can be formed by analyzing relationship chains of the target people and using designated feature filtering conditions. Network users or distributors can use the relationship circle of the target people to find out valuable relationship chain information, enable accurate search and transmission of information, and facilitate promotion and cooperation of business activities.

Figure 1:
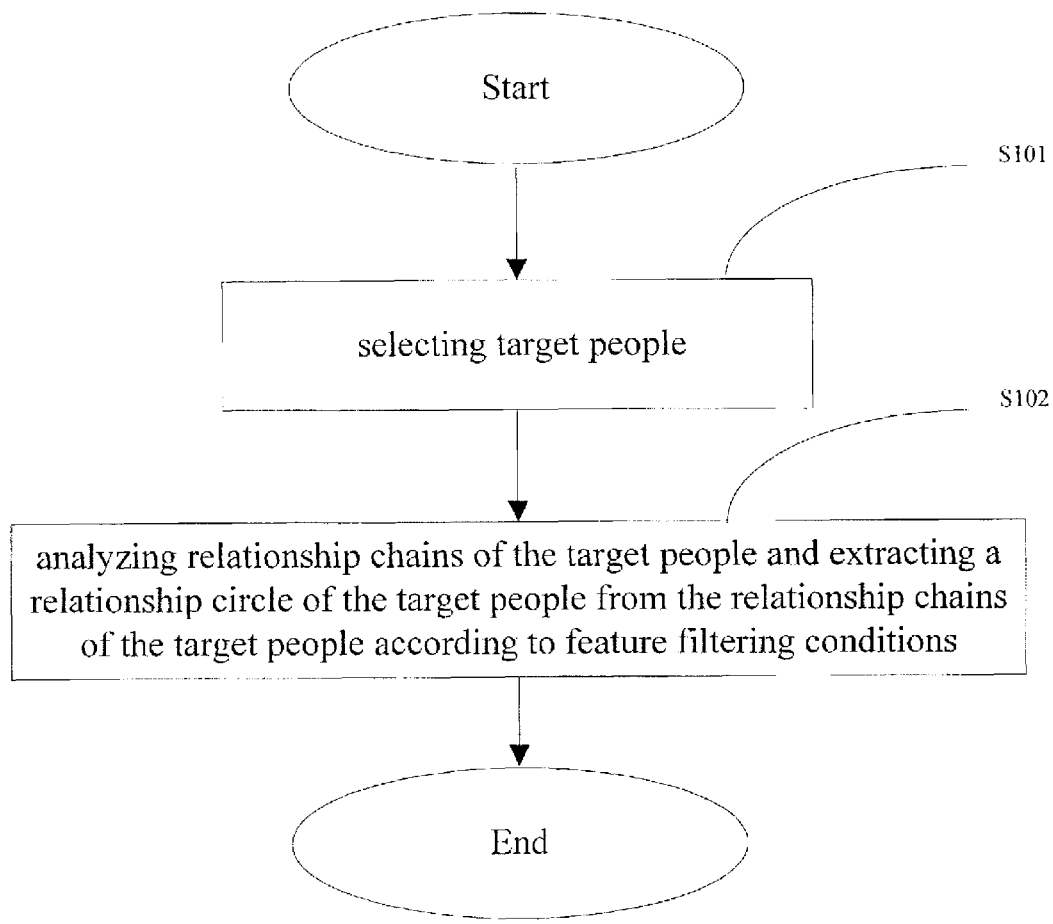
FIG. 1 is a flowchart illustrating a method for extracting relationship circle of members in SNS network according to a first embodiment of the invention.

FIG. 1 is a flowchart illustrating a method for extracting relationship circle of members in SNS network according to a first embodiment of the invention, the specific process of the method is as follow:

In step S101, target people are first selected in the SNS network. The target people can be selected from members in SNS network based on specific query conditions, for example, the query condition can be sports or entertainment stars. The query condition can also be one or some designated network members, for example, Beckham, Ronaldo and Ronaldo•Godinho can be directly designated as target people.

In step S102, relationship chains of the target people are analyzed, and a relationship circle of the target people is extracted from the relationship chains of the target people according to feature filtering conditions. In one embodiment, the relationship chains can include the entire contact person's information of the target people, contact information between the contact persons and other members in the SNS network and other related information. For example, target staff A knows B, B knows C, then, A and B have direct contact while A and C have indirect contact. A, B and C together with their related information define a most simple relationship chain of the target staff.

Figure 2:
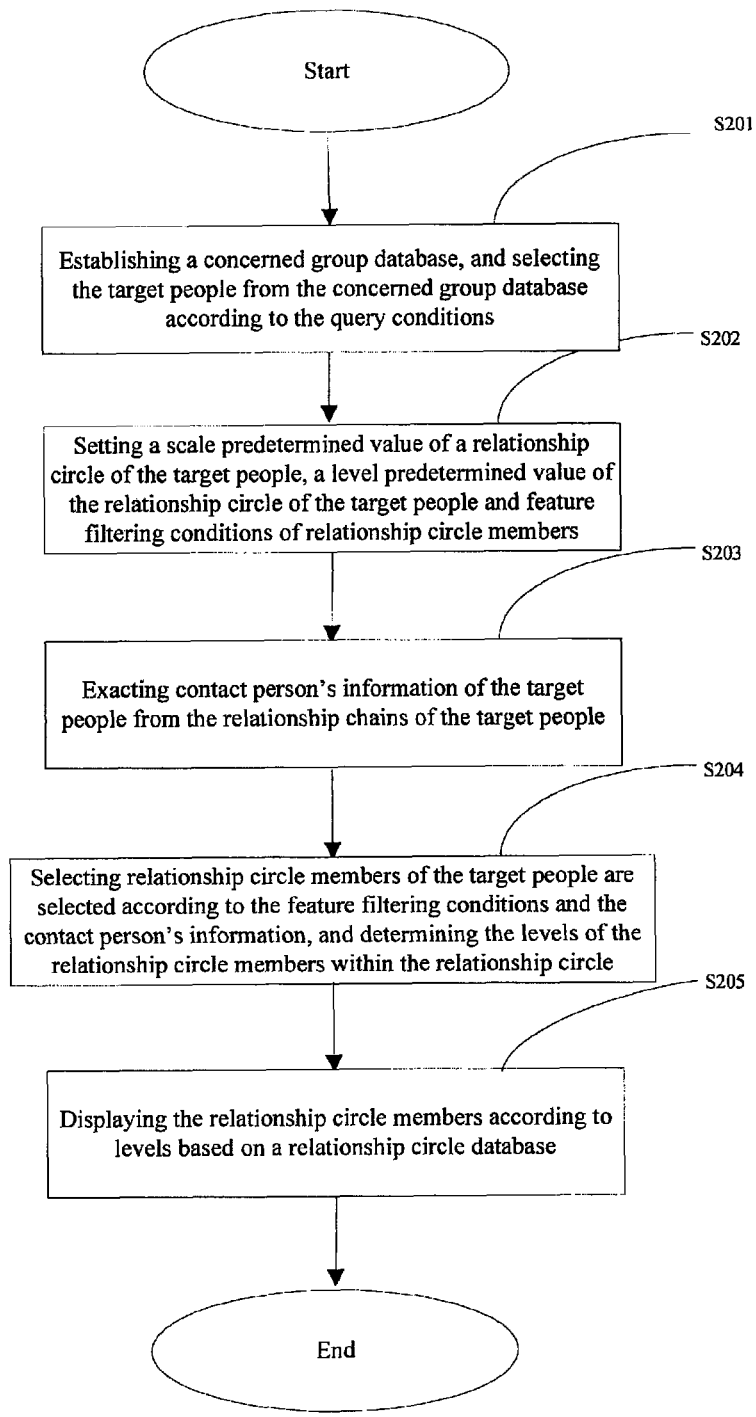
FIG. 2 is a flowchart illustrating a method for extracting relationship circle of members in SNS network according to a second embodiment of the invention.

FIG. 2 is a flowchart illustrating a method for extracting relationship circle of members in SNS network according to a second embodiment of the invention, the specific process of the method is as follow:

In step S201, a concerned group database can be established in a server side in the SNS network, and target people are selected from the concerned group database according to query conditions. The concerned group database can be formed through collection from the real word or the media, it can be obtained through artificial means or news statistics units of portal sites, and can also be obtained according to search engine rankings.

Further, in one embodiment of the invention, the establishment of the concerned group database can be achieved though the following ways. An SNS network member database is first constructed to store information of members in the SNS network. Next, feature keywords are extracted from the SNS network member database through a self-developed or third-party designed feature-statistical-rule-database. Then, features of the members in the SNS network are extracted from the SNS network member database according to the feature keywords. Finally, as needed, concerned groups are selected according to designated features from the SNS network member database to establish the concerned group database. In this concerned group database, feature information of the concerned group and unique identifies of the concerned group corresponding to the SNS network can be stored. Feature information of each concerned person can be expressed as (type, value), for example the user A's favorite movie is A Beautiful Mind, and then the feature information can be expressed as (favorite movie, A Beautiful Mind). The unique identify of each concerned person can be a login account to Instant message (IM). Table 1 lists information of concerned persons stored in the concerned group database.

Table 1 Information of Concerned Group

TABLE 1

| Name | Feature information | unique identify corresponding to the SNS network |
| --- | --- | --- |
| Beckham | (Favorite fruit, banana) (Favorite star, Hoddle, Bryan Robson. EricCantona) | Beckham@qq.com |

TABLE 1-continued

| Name | Feature information | unique identify corresponding to the SNS network |
| --- | --- | --- |
| | (Favorite designers, Gucci, Armani) (Favorite color, red) (Favorite drinks, champagne, red wine, mineral water) | |
| ... | ... | ... |

The selection of the target people can be based on the concerned group database. For example, the query condition can be set to world class stars, concerned group who meet the query condition such as Beckham and Ronaldo and so on are selected from the concerned group database as the target people.

In one simplified embodiment of the invention, more complex query conditions can be directly designated and used to select target people from the SNS network member database. In another simplified embodiment of the invention, target people can be directly designated.

In step S202, a predetermined scale value of a relationship circle of target people, a predetermined level value of the relationship circle of the target people and feature filtering conditions of relationship circle members can be set. For example, in the previous selection of Beckham and Ronaldo and so on as the target people, the total number of people of their relationship circle can be set to 900, the level can be 3 layers and the number of people of each layer can be 300 respectively (the number of people of each layer can be the same, or different). The feature filtering conditions can be (career, player), (other, filmed ads). Thus, in this embodiment, group who have appeared in advertisements and work as players are needed to find out from the relationship circle of target people.

In step S203, contact person's information of the target people can be extracted from the relationship chains of the target people. The contact person's information can be unique identifies of the contact persons corresponding to the SNS network, feature information, relationship type and relationship weight. The contact person's information can include lists of contact persons who are directly or indirectly contacted by the target people through the SNS network, such as IM buddy list, access to user blog and so on. Further, the relationship between the target people and the contact persons can be expressed as (ID, type, value). ID represents unique identifies of the contact persons corresponding to the SNS network. Type represents relationship type, for example can be defined as friends, acquaintance and stranger. Value can be defined as relationship weight that is the importance of the relationship. Greater weight represents better relationship, contacting more closely and more frequently. Those skilled in the art can use any know method or data to identify contact person's information of the target people.

In step S204, relationship circle members of the target staff are selected according to the feature filtering conditions and the contact person's information, and the levels of the relationship circle members within the relationship circle are determined.

In step S205, the relationship circle members are displayed according to levels based on a relationship circle database. In one embodiment of the invention, the display content includes feature information, relationship type, weight information and relationship path of the relationship circle members.

Figure 8:
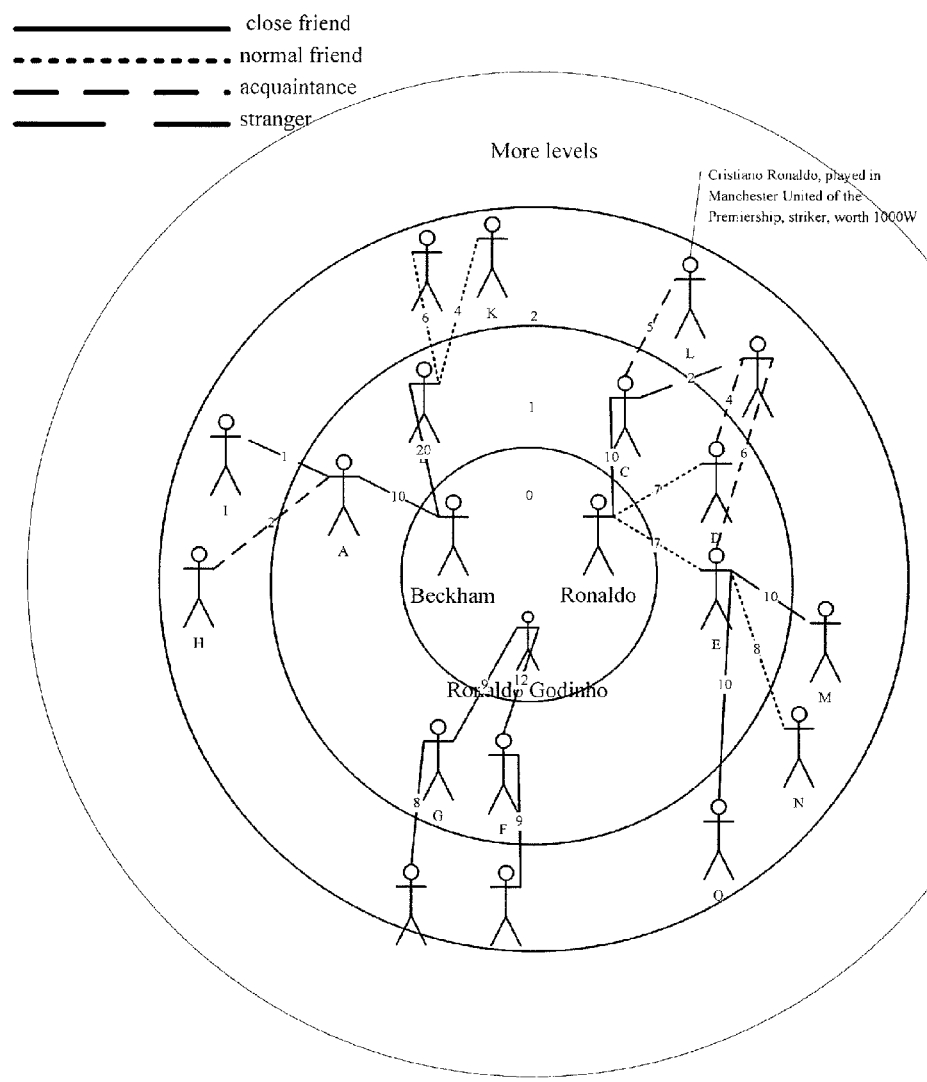
FIG. 8 is a schematic illustrating a relationship circle of target people extracted by using one embodiment of the method or the device of the invention.
Figure 9:
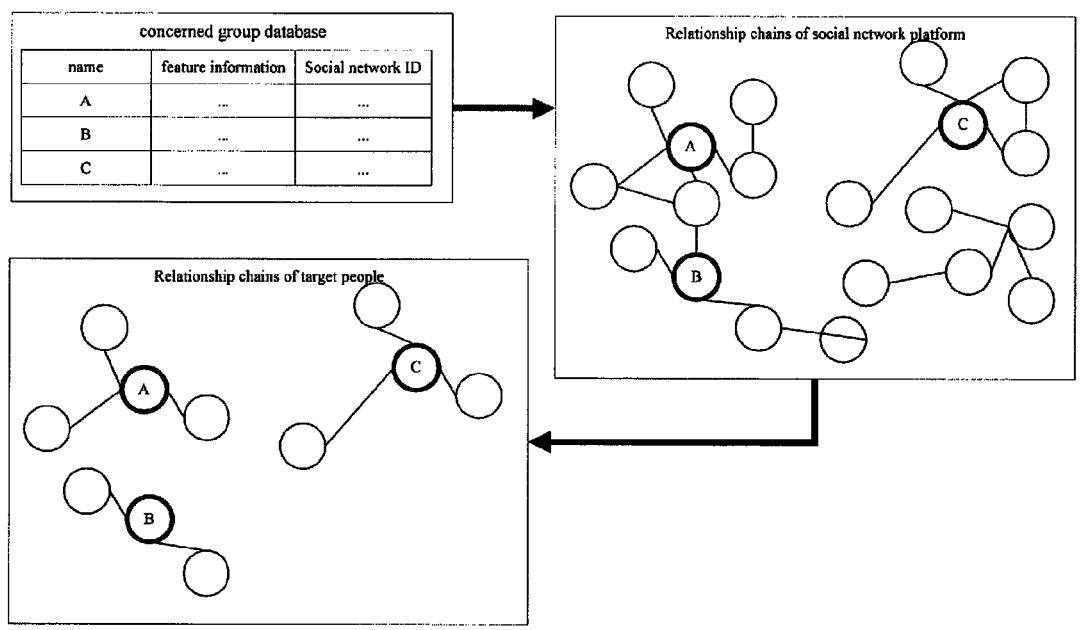
FIG. 9 is a schematic illustrating an extraction process of the relationship circle of the target people according to the invention.

FIG. 9 shows an extraction process of the relationship circle of the target people according to the method of FIG. 2. FIG. 8 shows a multi-layer relationship circle. In the figures, lines of different styles are used to represent relationship types, and line values are further used to represent relationship actual weight, the greater the weight, the more closely the relationship. Each ring represents a level of relationship. When there are direct or indirect contacts between every two relationship circle members, edges of the relationship are connected to form the paths.

Figure 3:
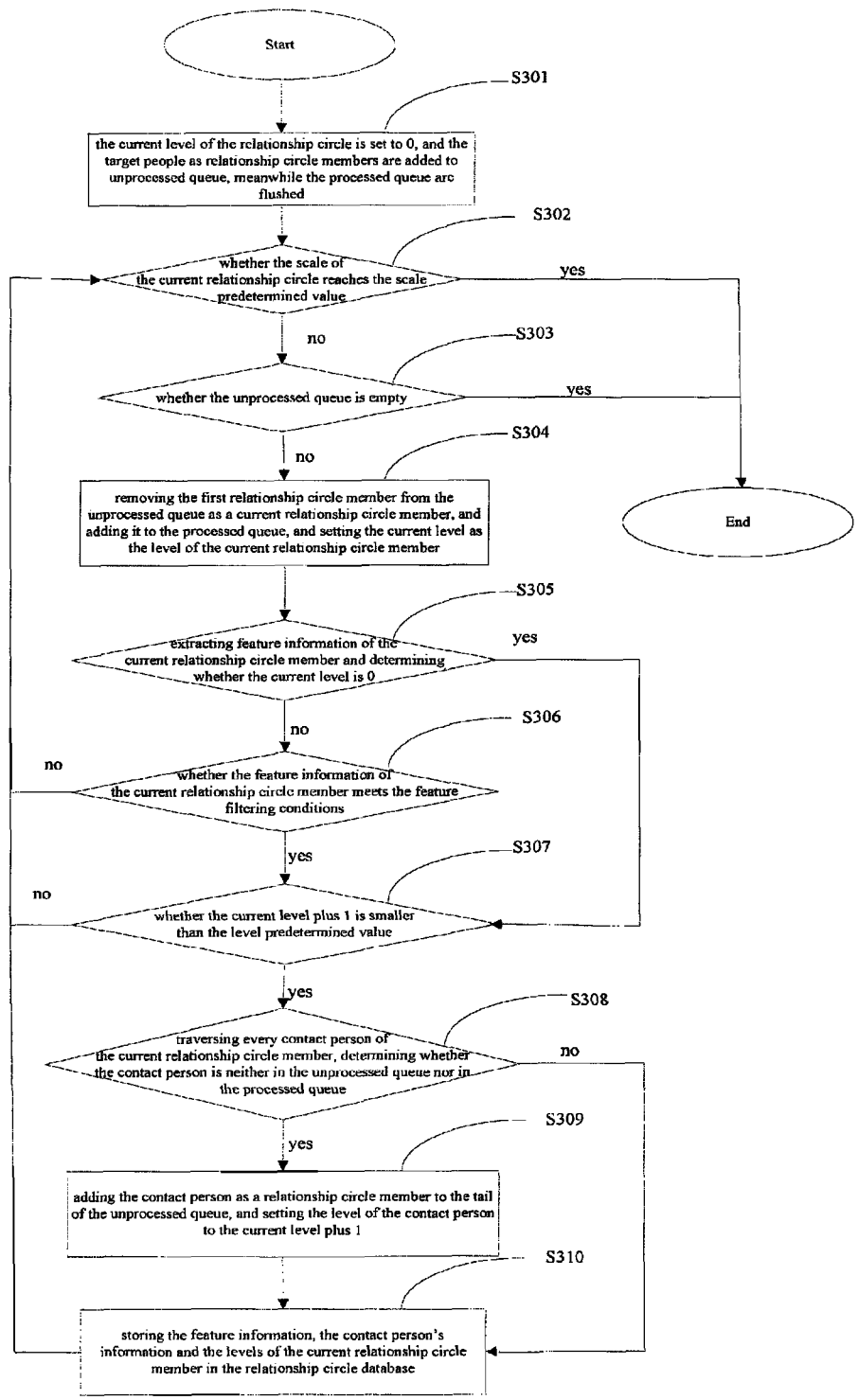
FIG. 3 is a flowchart illustrating a process of determining relationship circle members of target staff with their levels in a method for extracting relationship circle of members in SNS network.

FIG. 3 shows a representative embodiment of step S204 of FIG. 2. As shown in FIG. 3, in step S301, the current level of the relationship circle is set to 0, and the target people as relationship circle members are added to unprocessed queue, meanwhile the processed queue are flushed.

In step S302, whether the scale of the current relationship circle reaches the scale predetermined value is determined, if it is then the extraction process of the relationship circle is completed, and the process ends; otherwise step S303 is performed. In this step, the determination of the scale of the relationship circle can include determination of the number of relationship circle members of each layer and determination of the total number of people of the relationship circle.

In step S303, whether the unprocessed queue is empty is determined, if it is then the extraction process of the relationship circle is completed, and the process ends; otherwise step S304 is performed.

In step S304, the first relationship circle member is removed from the unprocessed queue as a current relationship circle member, and is added to the processed queue, and the current level is set as the level of the current relationship circle member.

In step S305, feature information of the current relationship circle member is extracted and whether the current level is 0 is determined, if it is then step S307 is performed, otherwise step S306 is performed;

In step S306, whether the feature information of the current relationship circle member meets the feature filtering conditions is determined, if it is then step S307 is performed, otherwise step S302 is performed;

In step S307, whether the current level plus 1 is smaller than the level predetermined value, if it is then step S308 is performed, otherwise step S302 is performed;

In step S308, every contact person of the current relationship circle member is traversed, if the contact person is neither in the unprocessed queue nor in the processed queue then step S309 is performed, otherwise step S310 is performed;

In step S309, the contact person as a relationship circle member is added to the tail of the unprocessed queue, and the level of the contact person is set to the current level plus 1, then step S310 is performed;

In step S310, the feature information, the contact person's information and the levels of the current relationship circle member are stored in the relationship circle database, and then step S302 is performed. In this step, the storage of feature information, contact person's information and levels of the current relationship circle member is shown in table 2.

Table 2 Information of Relationship Circle Members

TABLE 2

| unique identify corresponding to the SNS network | Feature information | Related information | level |
|---|---|---|---|
| A | (type1, value1), (type2, value2), . . . | (ID1, type1, value1), (ID2, type2, value2), . . . | 0 |

TABLE 2-continued

| unique identify corresponding to the SNS network | Feature information | Related information | level |
|---|---|---|---|
| B | (type1, value1), (type2, value2), . . . | (ID1, type1, value1), (ID2, type2, value2), . . . | 1 |
| . . . | . . . | . . . | |

Figure 4:
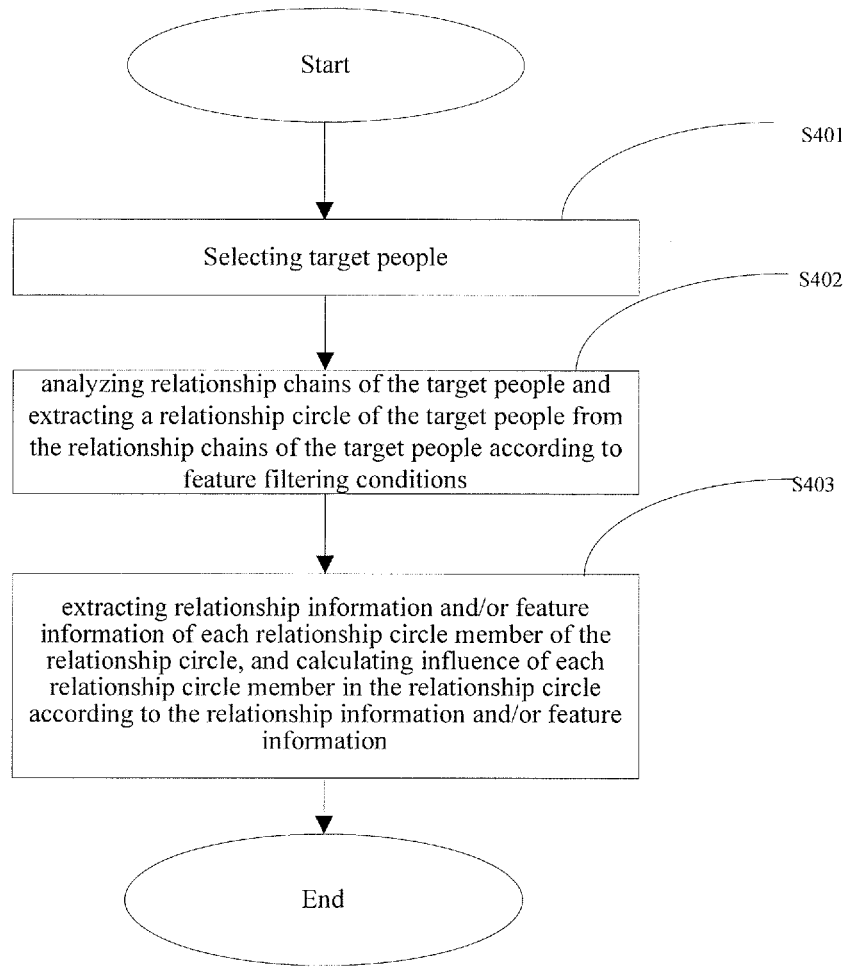
FIG. 4 is a flowchart illustrating a method for extracting relationship circle of members in SNS network according to a third embodiment of the invention.

FIG. 4 is a flowchart illustrating a method for extracting relationship circle of members in SNS network according to a third embodiment of the invention, the specific process of the method is as follow:

In step S401, target people are first selected in the SNS network. The target people can be selected from members in SNS network based on specific query, for example, the query can be sports or entertainment stars. The query can also be one or some designated network members, for example, David Beckham, Ronaldo and Ronaldo•Godinho can be directly designated as the target people.

In step S402, relationship chains of the target people are analyzed, and relationship circle of the target people is extracted from the relationship chains of the target people according to feature filtering conditions.

In step S403, relationship information and/or feature information of each relationship circle member of the relationship circle are extracted, and influence of each relationship circle member in the relationship circle is calculated according to the relationship information and/or feature information. The relationship information and/or feature information can be directly obtained from the relationship chains of the target people; can also be obtained from the concerned group database. The establishment of the concerned group database can refer to previous description. Feature information of the relationship circle members can be expressed as (type, value), for example the user A's favorite movie is A Beautiful Mind, and then the feature information can be expressed as (favorite movie, A Beautiful Mind).

According to the method of the invention, influence of each relationship circle member in the relationship circle can be calculated, this helps to find out the most influential people in the relationship circle and make the information transmission and retrieval more targeted.

Figure 5:
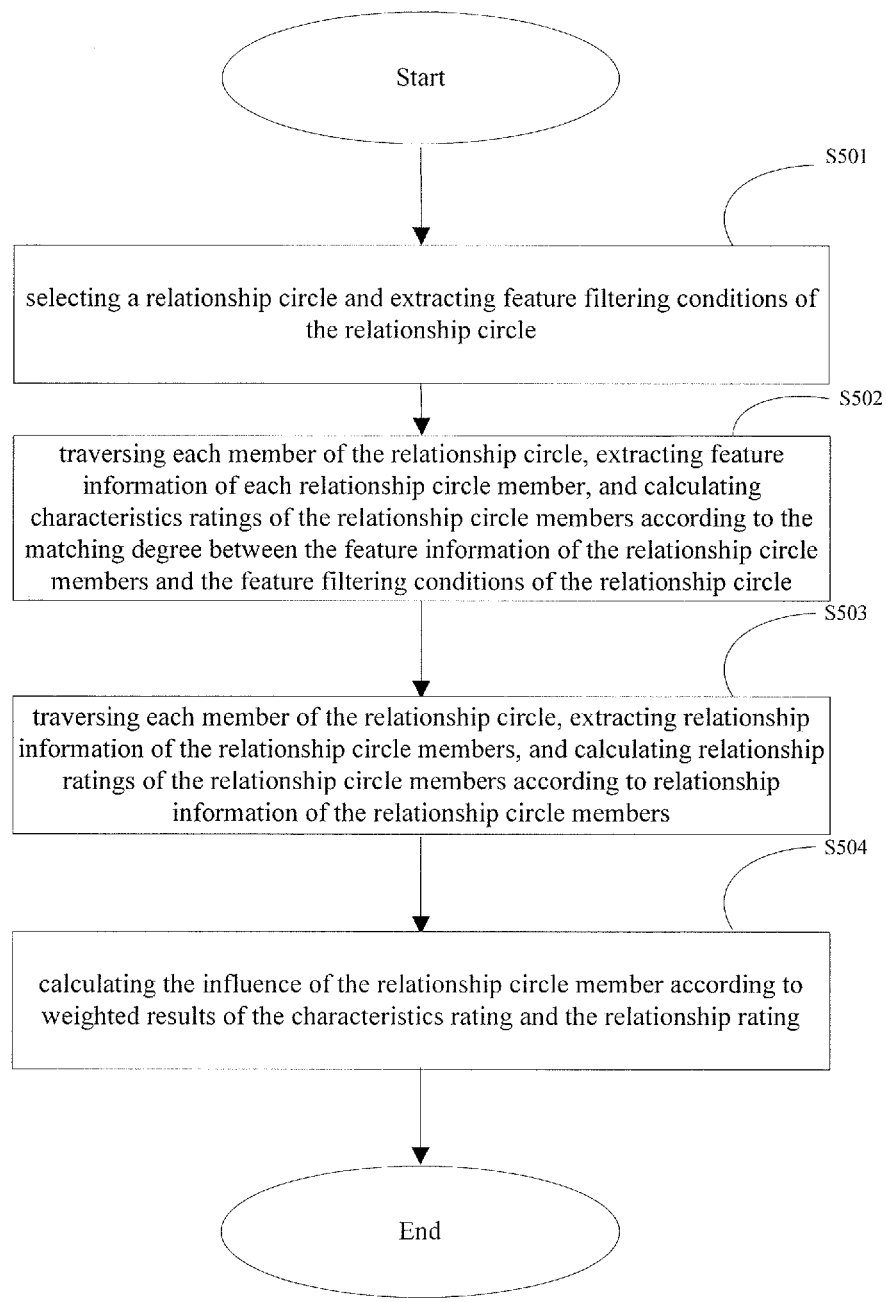
FIG. 5 is a flowchart illustrating steps of influence calculation of a method for extracting relationship circle of members in SNS network.

FIG. 5 is a representative embodiment of the steps of influence calculation of FIG. 4. As shown in FIG. 5, the steps of influence calculation are as follow:

In step S501, a relationship circle is selected and feature filtering conditions of the relationship circle are extracted.

In step S502, each member of the relationship circle is traversed, feature information of each relationship circle member is extracted, and characteristics ratings of the relationship circle members are calculated according to the matching degree between the feature information of the relationship circle members and the feature filtering conditions of the relationship circle.

The characteristics rating of each relationship circle member belonged to some relationship circle can be calculated as follows:

$S$(relationship circle member ID)={matching degree between the feature information of the relationship circle member and the feature filtering conditions of the relationship circle}

For example, when the feature filtering conditions extracted for a relationship circle is playing online games, information of users playing the online games including time, game rating conditions can be converted to corresponding game points, thereby serving as characteristics rating.

In step S503, each member of the relationship circle is traversed to extract relationship information of the relationship circle members, and relationship ratings of the relationship circle members can be calculated according to relationship information of the relationship circle members. The relationship information includes relationship type between the relationship circle members, weight information, and relationship path.

In one embodiment of the invention, a characteristics rating function is designed as follows:

> $R$(relationship circle member ID)={relationship type between the relationship circle member and each of the other relationship circle members, if it is friend 10 points added, if it is acquaintance 5 point added, if it is stranger 1 point added}

In another embodiment of the invention, a characteristics rating function is designed as follows:

> $R$(relationship circle member ID)={$\Sigma$relationship type between the relationship circle member and each of the other relationship circle members*weight}

Weight represents the importance of the relationship. Greater weight represents better relationship, contacting more closely and more frequently. For example, if the relationship type is friend 10 points are counted, if the relationship type is acquaintance 5 points are counted, if the relationship type is stranger 1 point is counted. If the contact number is more than 5 times in one month 3 points are counted, if the contact number is 3-5 times in one month 2 points are counted, if contact number is less than 3 times in one month 1 point is counted.

In step S504, the influence of the relationship circle member can be calculated according to weighted results of the characteristics rating and the relationship rating.

In one embodiment of the invention, an influence rating function is designed as follows:

> $E$(relationship circle member ID)=characteristics rating*$f$+relationship rating*$(1-f)$.

Greater characteristics rating indicates the member matching better with the feature filtering conditions and having a greater influence.

Greater relationship rating indicates closer relationship between the relationship circle member and the other relationship circle members and a greater influence of the relationship circle member.

$f$ represents influence weight, the default is 0.5, and it can be adjusted according to actual needs.

In one simplified embodiment of the invention, influence of the relationship circle member can be directly calculated according to feature information, and is called feature influence hereinafter. The process includes:

1. A relationship circle is selected and feature filtering conditions of the relationship circle are extracted.

2. Each member of the relationship circle is traversed to extract feature information of each relationship circle member, and the feature influences of the relationship circle members are calculated according to the matching degree between the feature information of the relationship circle members and the feature filtering conditions of the relationship circle.

The feature influence of each relationship circle member belonged to some relationship circle can be calculated as follows:

> $SE$(relationship circle member ID)={matching degree between the feature information of the relationship circle member and the feature filtering conditions of the relationship circle}.

Greater feature influence of the relationship circle member indicates the relationship circle member matching better with the feature filtering conditions of the relationship circle.

In another simplified embodiment of the invention, influence of the relationship circle member can be directly calculated according to related information, and is called relationship influence hereinafter. The process includes:

1. A relationship circle is selected, each member of the relationship circle is traversed to extract related information of each relationship circle member. The related information includes relationship type between the relationship circle members, weight information and relationship path.

2. The relationship influences of the relationship circle members are calculated according to the related information of the relationship circle members.

The relationship influences of each relationship circle member belonged to some relationship circle can be calculated as follows:

> $RE$(relationship circle member ID)={$\Sigma$relationship type between the relationship circle member and each of the other relationship circle members*weight}

> Or $RE$(relationship circle member ID)={relationship type between the relationship circle member and each of the other relationship circle members, if it is friend 10 points added, if it is acquaintance 5 points added, if it is stranger 1 point added}

Greater relationship influences indicates closer relationship between the relationship circle member and the other relationship circle members.

Figure 6:
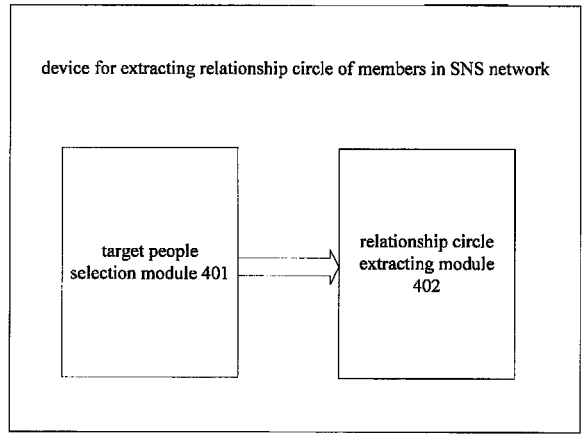
FIG. 6 is a schematic illustrating a device for extracting relationship circle of members in SNS network according to a first embodiment of the invention.

FIG. 6 is a schematic illustrating a device for extracting relationship circle of members in SNS network according to a first embodiment of the invention. This embodiment is a simplified embodiment of the invention. The device of the invention includes a target people selection module 401 and a relationship circle extracting module 402. The target people selection module 401 can be used to select the target people. The target people can be selected from members in SNS network based on specific query, and can also be some network member directly designated by users. For example, the query can be sports or entertainment stars, and David Beckham, Ronaldo and Ronaldo•Godinho can also be directly designated as the target people.

The relationship circle extracting module 402 is for analyzing the relationship chains of the target people and extracting the relationship circle of the target people from the relationship chains of the target people according to the feature filtering conditions. In one embodiment, the relationship chains can include the entire contact person's information of the target people, contact information between the contact persons and other members in the SNS network and other related information. For example, target staff A knows B, B knows C, then, A and B have direct contact while A and C have indirect contact. A, B and C together with their related information define a most simple relationship chain of the target staff.

In another embodiment of the invention, the device for extracting relationship circle of members in SNS network further includes an influence calculating module (not shown). The influence calculating module is for calculating influence of each relationship circle member in the relationship circle according to the relationship information and/or feature information of each relationship circle member of the relationship circle. The relationship information and/or feature information can be directly obtained from the relationship chains of the target people; can also be obtained from the concerned group database. The establishment of the concerned group database can refer to previous description.

Figure 7:
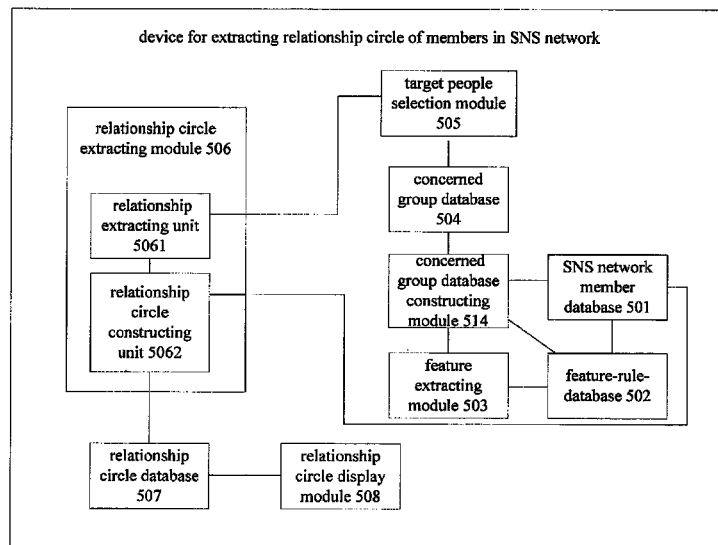
FIG. 7 is a schematic illustrating a device for extracting relationship circle of members in SNS network according to a second embodiment of the invention.

FIG. 7 is a schematic illustrating a device for extracting relationship circle of members in SNS network according to a second embodiment of the invention. In this embodiment, the SNS network member database 501 is used to store information of members in the SNS network. The information of members in the SNS network can be self-administered by the network members during registration, and can also be collected from data published by the networked media through search engines. The information of members in the SNS network includes unique identifies of the network members corresponding to the SNS network, feature information, relationship chains and the like which appears in any network or real life, or has been recorded.

The feature-rule-database 502 is connected to the SNS network member database 501 to store feature keywords extracted from the SNS network member database 501. The extraction of the feature keywords can adopt any method and rule public in the art, and those skilled in the art are familiar with and able to skillfully apply these methods and rules. The feature extracting module 503 is connected to the SNS network member database 501 through the feature-rule-database 502, to select the feature keywords from the feature-rule-database 502 and extract features of network members from the SNS network member database 501 according to the feature keywords. The concerned group database constructing module 514 can be connected to the SNS network member database 501, the feature extracting module 503 and the feature-rule-database 502, so that concerned group can be selected from the SNS network member database 501 according to the designated features and be added into the concerned group database 504. In other embodiments of the invention, the concerned group database 504 can also be constructed through other ways.

In this embodiment, the target people selection module 505 can be connected to the concerned group database 504, and can select the target people from the concerned group database 504. In other embodiments of the inventions, the target people selection module 505 can also directly receive external input, or obtain the target people using other ways.

In this embodiment, the relationship circle extracting module 506 includes a relationship extracting unit 5061 and a relationship circle constructing unit 5062. In one embodiment of the invention, the relationship extracting unit 5061 can be simultaneously connected to the target people selection module 505 and the SNS network member database 501, and obtain the target people from the target people selection module 505, and then extract the relationship chains of the target people from the SNS network member database 501 according to unique identifies of the target people corresponding to the SNS network, thereby obtaining the contact person's information.

The contact person's information can be unique identifies of the contact persons corresponding to the SNS network, feature information, relationship type and relationship weight. The contact person's information can include lists of contact persons who are directly or indirectly contacted by the target people through the SNS network, such as IM buddy list, access to user blog and so on. Further, the relationship between the target people and the contact persons can be expressed as (ID, type, value). ID represents unique identifies of the contact persons corresponding to the SNS network, type represents relationship type, for example can be defined as friends, acquaintance, stranger. Value can be defined as relationship weight that is the importance of the relationship. Greater weight represents better relationship, contacting more closely and more frequently.

In another embodiment of the invention, the target people selection module 505 selects the target people and extracts the relationship chains simultaneously. The relationship extracting unit 5061 can directly obtain contact person's information from the target people selection module 505.

In other embodiments of the invention, the relationship extracting unit 5061 can also use other known techniques in the art to extract the relationship chains of the target people from other modules (such as the concerned group database 504), thereby obtaining the contact person's information.

The relationship circle constructing unit 5062 can extract relationship circle members of the target staff according to the feature filtering conditions and the contact person's information, and determine levels of the relationship circle members within the relationship circle. The extraction of the relationship circle members and the determination of the levels can be referred to FIG. 3. Those skilled in the art can also use other determine processes to perform this step based the teachings of the invention.

In one embodiment of the invention, the relationship circle display module 508 can be directly connected to the relationship circle constructing unit 5062, to display the relationship circle members (not shown) according to levels.

In one embodiment of the invention, relationship circle constructed by the relationship circle constructing unit 5062 can be stored in the relationship circle database 507. The relationship circle display module 508 can be connected to the relationship circle database 507 (referring to FIG. 7), and display the relationship circle members according to levels. Data of each relationship circle stored in the relationship circle database 507 are in table form, and the table includes ID, feature information, contact person's information, level information of each member.

Those skilled in the art can understand that performing all or part of the processes of the methods of the above embodiments can use computer programs to control corresponding hardware to complete, the programs can be stored in a computer-readable storage medium and can include processes of the embodiments of the above methods. The storage medium can be diskette, compact disc, read-only memory (ROM) or random access memory (RAM).

The foregoing are only preferred embodiments of the present invention and are not for use in limiting the protection scope thereof. All modifications, equivalent replacements or improvements in accordance with the spirit and principles of the present invention shall be included in the protection scope of the present invention.

The invention claimed is:

1. A method for extracting a relationship circle of members in a social network service (SNS) network, comprising:
 (a) selecting target people in the SNS network; and
 (b) analyzing relationship chains of the target people, and extracting the relationship circle of the target people from the relationship chains of the target people according to feature filtering conditions;
 wherein the relationship chains comprise contact person's information of the target people comprising feature information of a contact person; and
 the operation of extracting the relationship circle of the target people from the relationship chains of the target people according to feature filtering conditions comprises:
 extracting relationship circle members of the target people from the relationship chains of the target people according to the feature filtering conditions and the feature information of the contact person;

wherein the step (a) comprises:

(a1) establishing a concerned group database, and selecting the target people from the concerned group database according to query conditions; and (a2) setting a scale predetermined value of the relationship circle of the target people, a level predetermined value of the relationship circle of the target people and feature filtering conditions of relationship circle members;

wherein the step (b) comprises:

(b1) extracting the contact person's information of the target people from the relationship chains of the target people; and (b2) selecting the relationship circle members of the target people according to the feature filtering conditions and the contact person's information, and determining levels of the relationship circle members within the relationship circle;

wherein the step (b2) comprises:

(b21) setting a current level of the relationship circle to O, and adding the target people as relationship circle members to an unprocessed queue, meanwhile flushing a processed queue;

(b22) determining whether the scale of a current relationship circle reaches the scale predetermined value, if it is, extracting the current relationship circle, otherwise proceeding to step (b23);

(b23) determining whether the unprocessed queue is empty, if it is, extracting the current relationship circle, otherwise removing a first relationship circle member from the unprocessed queue as a current relationship circle member added to the processed queue, and setting a current level to be a level of the current relationship circle member;

(b24) extracting feature information of the current relationship circle member, and determining whether the current level is O, if it is, proceeding to step (b26), otherwise proceeding to step (b25);

(b25) determining whether the feature information of the current relationship circle member meets the feature filtering conditions, if it is, proceeding to step (b26), otherwise proceeding to step (b22);

(b26) determining whether the current level plus 1 is smaller than the level predetermined value, if it is, proceeding to step (b27), otherwise proceeding to step (b22)

(b27) traversing every contact person of the current relationship circle member, if the contact person is neither in the unprocessed queue nor in the processed queue, the contact person as a relationship circle member is added to a tail of the unprocessed queue, setting a level of the contact person to the current level plus 1; otherwise proceeding to step (b28); and (b28) storing the feature information, contact person's information and levels of the current relationship circle member in a relationship circle database, and then proceeding to step (b22).

2. The method of claim 1, wherein the concerned group database stores feature information of concerned group and unique identifies of the concerned group corresponding to the SNS network.

3. The method of claim 1, further comprising:

(c) displaying the relationship circle members according to levels based on information of the relationship circle database.

4. The method of claim 1, further comprising:

(d) extracting relationship information and/or feature information of each relationship circle member of the relationship circle, and calculating influence of each relationship circle member in the relationship circle according to the relationship information and/or feature information.

5. The method of claim 4, wherein the step (d) comprises:

(d1) extracting feature information of the relationship circle members, and calculating characteristics ratings of the relationship circle members according to the matching degree between the feature information of the relationship circle members and the feature filtering conditions of the relationship circle;

(d2) extracting relationship information of the relationship circle members, and calculating relationship ratings of the relationship circle members according to relationship information of the relationship circle members; and (d3) calculating influence of the relationship circle members according to weighted results of the characteristics ratings and the relationship ratings.

* * * * *